United States Patent
Uhm et al.

(10) Patent No.: US 10,673,047 B2
(45) Date of Patent: Jun. 2, 2020

(54) CABLE-TYPE SECONDARY BATTERY

(71) Applicant: LG Chem, Ltd., Seoul (KR)

(72) Inventors: In-Sung Uhm, Daejeon (KR);
Je-Young Kim, Daejeon (KR); Suk-In Noh, Daejeon (KR); Young-Ji Yuk, Daejeon (KR); Dong-Chan Lee, Daejeon (KR)

(73) Assignee: KG Chem, Ltd. (KR)

( * ) Notice: Subject to any disclaimer, the term of this patent is extended or adjusted under 35 U.S.C. 154(b) by 180 days.

(21) Appl. No.: 15/772,300

(22) PCT Filed: Feb. 6, 2017

(86) PCT No.: PCT/KR2017/001295
§ 371 (c)(1),
(2) Date: Apr. 30, 2018

(87) PCT Pub. No.: WO2017/135790
PCT Pub. Date: Aug. 10, 2017

(65) Prior Publication Data
US 2018/0323418 A1 Nov. 8, 2018

(30) Foreign Application Priority Data
Feb. 5, 2016 (KR) .......... 10-2016-0015143

(51) Int. Cl.
*H01M 2/18* (2006.01)
*H01M 4/75* (2006.01)
(Continued)

(52) U.S. Cl.
CPC ............ *H01M 2/18* (2013.01); *H01M 2/026* (2013.01); *H01M 2/029* (2013.01);
(Continued)

(58) Field of Classification Search
CPC ................................ H01M 2/18; H01M 2/026
See application file for complete search history.

(56) References Cited

U.S. PATENT DOCUMENTS

| 2003/0087150 A1* | 5/2003 | Chung | ................ H01M 2/1673 429/129 |
|---|---|---|---|
| 2014/0079979 A1 | 3/2014 | Kwon et al. | |

(Continued)

FOREIGN PATENT DOCUMENTS

| JP | 2000228122 A | 8/2000 |
|---|---|---|
| KR | 20140035689 A | 3/2014 |

(Continued)

OTHER PUBLICATIONS

Search report from International Application No. PCT/KR2017/001295, dated May 22, 2017.

*Primary Examiner* — Olatunji A Godo
(74) *Attorney, Agent, or Firm* — Lerner, David, Littenberg, Krumholz & Mentlik, LLP

(57) ABSTRACT

The present disclosure relates to a cable type secondary battery which includes: a cable type electrode assembly including an inner electrode, a separator layer formed to surround the outer surface of the inner electrode and preventing a short-circuit between electrodes, and an outer electrode formed to surround the separator layer; a taping layer formed by spirally winding a sheet type tape so that it surrounds the outer surface of the cable type electrode assembly; and a packaging formed to surround the outer surface of the taping layer. According to the present disclosure, it is possible to prevent separation of the separator layer or the outer electrode, and thus to reinforce the bending characteristics of the cable type secondary battery.

20 Claims, 3 Drawing Sheets

(51) Int. Cl.
  *H01M 10/058* (2010.01)
  *H01M 2/02* (2006.01)
  *H01M 4/139* (2010.01)
  *H01M 2/16* (2006.01)
  *H01M 10/0525* (2010.01)

(52) U.S. Cl.
  CPC ......... *H01M 2/1673* (2013.01); *H01M 4/139* (2013.01); *H01M 4/75* (2013.01); *H01M 10/058* (2013.01); *H01M 10/0525* (2013.01); *H01M 2002/0205* (2013.01); *Y02E 60/122* (2013.01); *Y02T 10/7011* (2013.01)

(56) References Cited

U.S. PATENT DOCUMENTS

| | | | |
|---|---|---|---|
| 2014/0335391 A1 | 11/2014 | Kwon et al. | |
| 2014/0370347 A1* | 12/2014 | Jung | H01M 2/0275 |
| | | | 429/94 |
| 2017/0200979 A1 | 7/2017 | Kwon et al. | |

FOREIGN PATENT DOCUMENTS

| | | |
|---|---|---|
| KR | 20140128899 A | 11/2014 |
| KR | 20140145926 A | 12/2014 |
| KR | 20150146433 A | 12/2015 |

* cited by examiner

CABLE-TYPE SECONDARY BATTERY

CROSS-REFERENCE TO RELATED APPLICATIONS

The present application is a national phase entry under 35 U.S.C. § 371 of International Application No. PCT/KR2017/001295, filed Feb. 6, 2017, published in Korean, which claims priority to Korean Patent Application No. 10-2016-0015143 filed on Feb. 5, 2016 in the Republic of Korea, the disclosures of which are incorporated herein by reference.

TECHNICAL FIELD

The present disclosure relates to a freely deformable cable type secondary battery. More particularly, the present disclosure relates to a cable type secondary battery having reinforced bending characteristics.

BACKGROUND ART

A secondary battery refers to a device which converts external electric energy into the form of chemical energy and stores it therein, and then generates electricity as necessary. Such a secondary battery is also called the name of 'rechargeable battery' which means a battery capable of being charged many times. Typical secondary batteries include a lead storage battery, nickel cadmium (Ni—Cd) battery, nickel metal hydride (NiMH) battery, lithium ion (Li-ion) battery and a lithium ion (Li-ion) polymer battery. A secondary battery provides both an economical advantage and an environmental advantage as compared to a disposable primary battery.

Currently, a secondary battery is used for some applications requiring low electric power. For example, such applications include a device that helps starting of a car, portable system, instrument and a no-brake power supply system. Recently, development of wireless communication technology leads popularization of a portable system. In addition, there is a tendency to convert many conventional systems into wireless systems. Under these circumstances, there is an exploding demand for secondary batteries. Further, hybrid cars and electric cars have been commercialized with a view to preventing environmental pollution. Such next-generation vehicles adopt secondary batteries to reduce the cost and weight and to increase the service life.

In general, secondary batteries are generally provided as cylindrical, prismatic or pouch type batteries. This is because secondary batteries are manufactured by installing an electrode assembly including a positive electrode, a negative electrode and a separator into a cylindrical or prismatic metal can or a pouch type case made of an aluminum laminate sheet, and then injecting an electrolyte to the electrode assembly. Therefore, a predetermined space for installing a secondary battery is required essentially. Thus, such cylindrical, prismatic or pouch-like shapes of secondary batteries undesirably function as limitations in developing various types of portable systems. As a result, there is a need for a novel type of secondary battery which allows easy deformation.

To meet such a need, a cable type secondary battery, which has a significantly larger ratio of length to sectional diameter, has been suggested. The cable type secondary battery requires a certain degree of bending characteristics to accomplish its purpose of use, and generally requires a level of 5R of bend radius.

Particularly, when applying a cable type secondary battery to electric wires for Bluetooth earphones requiring high bending characteristics, it is required to integrate an inner electrode, separator and an outer electrode in order to prevent an increase in contact resistance in the cable type secondary battery.

DISCLOSURE

Technical Problem

The present disclosure is directed to providing a cable type secondary battery which further includes a taping layer to prevent separation of an electrode assembly and thus has reinforced bending characteristics.

Technical Solution

To solve the technical problem, in one aspect of the present disclosure, there is provided a cable type secondary battery which includes: a cable type electrode assembly including an inner electrode, a separator layer formed to surround the outer surface of the inner electrode and preventing a short-circuit between electrodes, and an outer electrode formed to surround the separator layer; a taping layer formed by spirally winding a sheet type tape so that it surrounds the outer surface of the cable type electrode assembly; and a packaging formed to surround the outer surface of the taping layer.

Herein, the sheet type tape may have a strip structure extended in one direction.

In addition, the sheet type tape may be wound spirally with an overlap.

Herein, the sheet type tape may be formed by spiral winding so that the width of the overlap may be 0.5 times or less of the width of the sheet type tape.

In addition, the sheet type tape may include any one selected from the group consisting of polyethylene terephthalate, polypropylene, thermoplastic polyurethane and Teflon, or a combination of two or more of them.

In addition, the sheet type tape may include a bonding layer so that it may retain its adhesion after the impregnation with an electrolyte.

Herein, the bonding layer may include any one selected from the group consisting of polyacrylate, polyimide, polyamide, polyacrylonitrile, cyanoacrylate and epoxy, or a combination of two or more of them.

Meanwhile, the outer electrode may be a sheet type outer electrode formed by spiral winding so that it surrounds the outer surface of the separator layer.

Herein, the sheet type outer electrode may have a strip structure extended in one direction.

Herein, the sheet type tape may be formed on the interface between the sheet type outer electrodes formed by spiral winding.

In addition, the packaging may be a sheet type packaging formed by spiral winding so that it surrounds the outer surface of the taping layer.

Herein, the sheet type packaging may have a strip structure extended in one direction.

Herein, the sheet type packaging may be formed by spiral winding with an overlap, wherein the width of the overlap may be 0.5 times or less of the width of the sheet type packaging.

Meanwhile, the sheet type packaging may be provided with a water barrier film, a first sealant polymer layer formed on one surface of the water barrier film, and a second sealant polymer layer formed on the other surface of the water barrier film.

Herein, the first sealant polymer layer and the second sealant polymer layer may include the same material.

In addition, the water barrier film may be a metal or polymer sheet, wherein the metal sheet may include any one selected from the group consisting of iron (Fe), carbon (C), chromium (Cr), manganese (Mn), nickel (Ni), copper (Cu) and aluminum (Al), or an alloy of two or more of them.

In addition, the polymer sheet may include any one selected from the group consisting of a polyethylene sheet, polypropylene sheet, polymer clay composite and liquid crystalline polymer sheet, or a combination of two or more of them.

In addition, each of the first sealant polymer layer and the second sealant polymer layer may include at least one selected from the group consisting of polypropylene-co-acrylic acid, polyethylene-co-acrylic acid, polypropylene chloride, polypropylene-butylene-ethylene terpolymer, polypropylene, polyethylene, polyethylene-co-propylene, or a combination of two or more of them.

Meanwhile, the sheet type packaging may further include a mechanical support layer formed between the water barrier film and the first sealant polymer layer or between the water barrier film and the second sealant polymer layer.

Herein, the mechanical support layer may include any one selected from the group consisting of polyester, polyamide, polyimide and polyolefin, or a combination of two or more of them.

Meanwhile, the cable type secondary battery may further include a heat shrinking tube surrounding the whole outer surface of the sheet type packaging formed by spiral winding.

Herein, the heat shrinking tube may include any one selected from the group consisting of polyolefin, polyester, fluororesin and polyvinyl chloride, or a combination of two or more of them.

In addition, the cable type secondary battery may further include an adhesive layer between the outer surface of the sheet type packaging and the heat shrinking tube.

Meanwhile, the inner electrode may be provided with a lithium ion-supplying core portion containing an electrolyte, an open structured inner current collector formed to surround the outer surface of the lithium ion-supplying core portion, and an inner electrode active material layer formed on the surface of the inner current collector.

Herein, the open structured inner current collector may be a wound wire type current collector, wound sheet type current collector or a mesh type current collector.

In addition, the inner electrode and the outer electrode may be a negative electrode and a positive electrode, respectively, or a positive electrode and a negative electrode, respectively.

Advantageous Effects

The cable type secondary battery according to the present disclosure further includes a taping layer on the outer surface of a cable type electrode assembly to prevent the separation of a separator layer or an outer electrode, and thus provides reinforced bending characteristics.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

DESCRIPTION OF DRAWING NUMERALS

Figure 1:
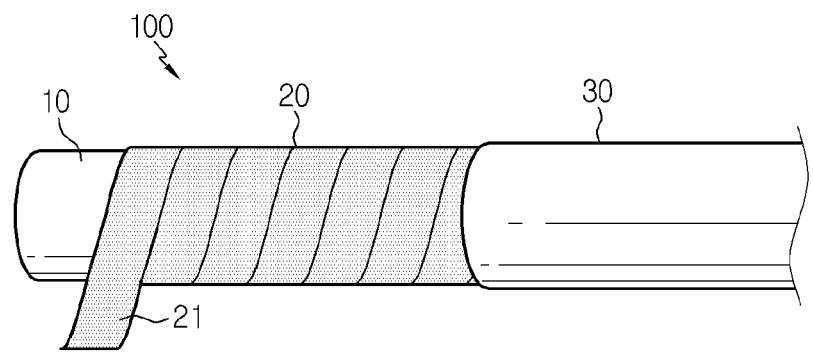
FIG. 1 is a schematic view illustrating the sheet type tape wound spirally to surround the outer surface of a cable type electrode assembly according to an embodiment of the present disclosure.

10: Cable type electrode assembly
20: Taping layer
21: Sheet type tape
30: Packaging
40: Sheet type packaging
41: Water barrier film
43: First sealant polymer layer
45: Second sealant polymer layer
47: Mechanical support layer
100: Cable type secondary battery

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 2:
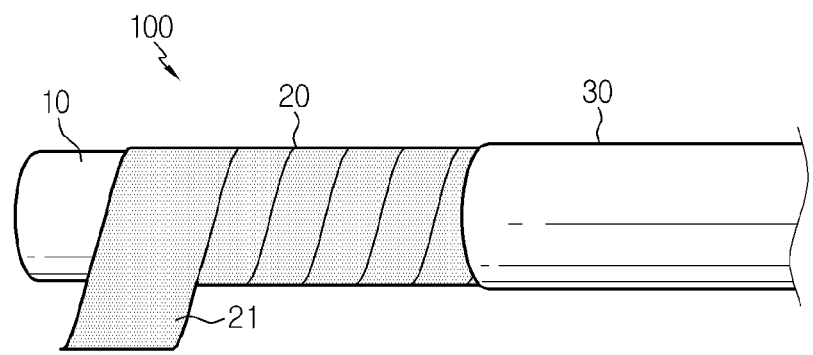
FIG. 2 is a schematic view illustrating the sheet type tape wound spirally to surround the outer surface of a cable type electrode assembly according to another embodiment of the present disclosure.

FIG. 1 and FIG. 2 are schematic views each illustrating the sheet type tape wound spirally to surround the outer surface of a cable type electrode assembly according to an embodiment of the present disclosure.

Referring to FIG. 1 and FIG. 2, the cable type secondary battery 100 according to an embodiment of the present disclosure includes: a cable type electrode assembly 10 including an inner electrode, a separator layer formed to surround the outer surface of the inner electrode and preventing a short-circuit between electrodes, and an outer electrode formed to surround the separator layer; a taping layer 20 formed by spirally winding a sheet type tape so that it surrounds the outer surface of the cable type electrode assembly; and a packaging 30 formed to surround the outer surface of the taping layer.

The taping layer 20 prevents the separation of the separator layer or outer electrode in the cable type electrode assembly 20, and allows the inner electrode/separator/outer electrode to be retained so that they are close contact with each other. Thus, it is possible to prevent an increase in contact resistance in the cable type secondary battery, and thus to prevent physical deterioration even when the battery is bent.

Herein, the term 'spiral' may be interchanged with 'helix', means a shape which winds diagonally in a certain range, and generally refers to a shape similar to the shape of a general spring.

Herein, the sheet type tape 21 may have a strip structure extended in one direction.

Referring to FIG. 1, the sheet type tape 21 is formed by spiral winding so that it is in close contact without any overlap. Referring to FIG. 2, the sheet type tape 21 is formed by spiral winding so that it has an overlap. Herein, the sheet type tape 21 may be formed by spiral winding so that the width of the overlap may be 0.5 times or less of the width of the sheet type tape 21 to prevent an excessive increase in thickness of the cable type secondary battery 100.

Meanwhile, the sheet type tape 21 may include any material as long as it has adhesive property and desired elastic force. Particular examples of the material include polyethylene terephthalate, polypropylene, thermoplastic polyurethane, Teflon, or the like.

In addition, the sheet type tape 21 preferably further includes a bonding layer so that it may retain adhesion even after the impregnation with an electrode. Particularly, the bonding layer may include polyacrylate, polyimide, polyamide, polyacrylonitrile, cyanoacrylate, epoxy, or the like.

Meanwhile, in order to improve the flexibility of the cable type secondary battery, the outer electrode according to the present disclosure may be a sheet type outer electrode formed by spiral winding to surround the outer surface of the separator layer. In this manner, it is possible to prevent cracking on the surface of the outer electrode active material layer.

Herein, the sheet type outer electrode may have a strip structure extended in one direction.

In addition, the sheet type tape may be formed at the interface between the sheet type outer electrodes formed by spiral winding. In this manner, it is possible to prevent the outer electrode from being separated from the electrode assembly more efficiently.

Meanwhile, the packaging according to the present disclosure may be a sheet type packaging formed by spiral winding to surround the outer surface of the taping layer.

Figure 3:
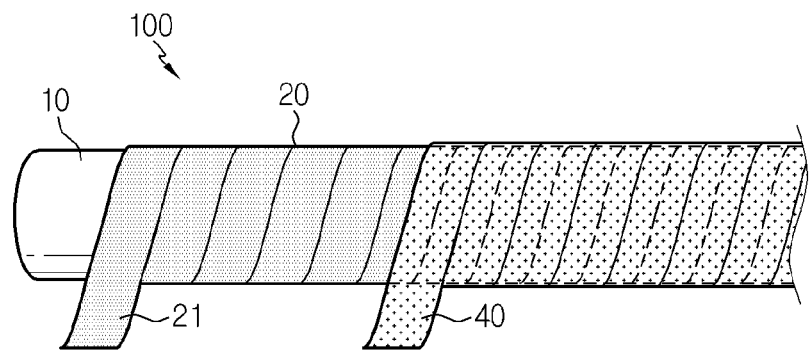
FIG. 3 is a schematic view illustrating the sheet type packaging wound spirally to surround the outer surface of a taping layer according to an embodiment of the present disclosure.

FIG. 3 is a schematic view illustrating the sheet type packaging 40 wound spirally to surround the outer surface of the taping layer 20.

When using a conventional tubular packaging made of a polymer material, water may infiltrate thereto through the micropores of the polymer, resulting in contamination of the electrolyte present in the battery and degradation of the performance of the battery.

To overcome the problem of water infiltration, a tubular pouch packaging made of metal foil may be used. Even when such a tubular pouch packaging made of metal foil is formed skin-tightly on a cable type electrode assembly, a space exists between the electrode assembly and the pouch packaging and they are not fixed to each other, and thus wrinkling occurs on the packaging surface when the battery is bent. In other words, when the battery is bent, the pouch packaging is also bent to apply stress the electrode assembly in the pouch packaging. Then, when such stress is accumulated, a microshort-circuit occurs in the battery, resulting in degradation of the flexibility of the battery. In addition, fatigue accumulation occurs due to repeated bending at the wrinkled portion formed on the surface of the pouch packaging, and thus the pouch packaging may be torn finally.

However, when the sheet type packaging 40 is formed by spiral winding to surround the outer surface of the taping layer 20 according to the present disclosure, external force can be dispersed even when the cable type secondary battery 100 is bent. Thus, it is possible to prevent folding or wrinkling of the surface of the packaging.

Herein, the sheet type packaging 40 may have a strip structure extended in one direction.

In addition, the sheet type packaging 40 may be formed by spiral winding so that it is in close contact without any overlap, or formed by spiral winding with an overlap. Herein, the sheet type packaging 40 may be formed by spiral winding so that the width of the overlap may be 0.5 times of less of the width of the sheet type packaging in order to prevent an excessive increase in thickness of the cable type secondary battery 100.

Figure 4:
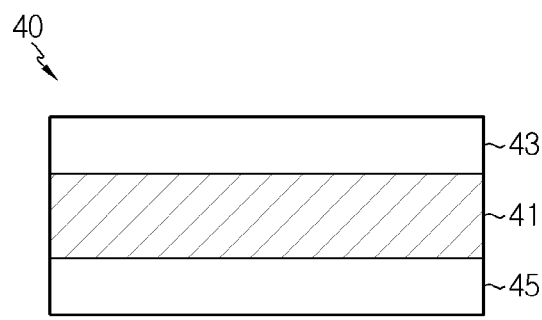
FIG. 4 is a schematic sectional view illustrating the sheet type packaging according to an embodiment of the present disclosure.

FIG. 4 is a schematic sectional view illustrating the sheet type packaging according to an embodiment.

Referring to FIG. 4, the sheet type packaging 40 according to the present disclosure may be provided with a water barrier film 41, a first sealant polymer layer 43 formed on one surface of the water barrier film, and a second sealant polymer layer 45 formed on the other surface of the water barrier film.

Herein, the water barrier film 41 functions to prevent infiltration of water from the outside to the inside and may be selected from metal sheets and polymer sheets having water barrier property.

The metal sheet having water barrier property may include any one selected from the group consisting of iron (Fe), carbon (C), chromium (Cr), manganese (Mn), nickel (Ni), copper (Cu), aluminum (Al) and equivalents thereof, or an alloy of at least two of them. However, the metal sheet is not limited to the above examples. When the metal sheet uses an iron-containing material, mechanical strength is increased. When the metal sheet uses an aluminum-containing material, flexibility is improved.

In addition, the polymer sheet having water barrier property may be at least one selected from the group consisting of polyethylene sheets, polypropylene sheets, polymer clay composites and liquid crystalline polymer sheets, or a combination of two or more of them.

The polymer clay composite means a composite including plate-like clay dispersed in a polymer. Since plate-like clay is arranged in a polymer, the length of a pass way, through which gas is emitted, is increased to inhibit passage of a gaseous ingredient. It is possible to interrupt water based on the same principle. In addition, the liquid crystalline polymer sheet is based on a liquid crystal polymer. In the liquid crystal polymer, a rigid segment including aromatic groups shows a behavior similar to that of a liquid crystal, which increases the length of a pass way in the same manner as clay of the polymer clay, thereby interrupting infiltration of water.

According to an embodiment, the first sealant polymer layer 43 and the second sealant polymer layer 45 have hot adhesion or hot fusion property which allows thermal adhesion. Each of the first sealant polymer layer and the second sealant polymer layer may independently include at least one selected from the group consisting of polypropylene-co-acrylic acid, polyethylene-co-acrylic acid, polypropylene chloride, polypropylene-butylene-ethylene terpolymer, polypropylene, polyethylene and polyethylene-co-propylene.

Herein, the first sealant polymer layer 43 and the second sealant polymer layer 45 may include the same material.

In this case, when the sheet type packaging 40 according to the present disclosure is formed by spiral winding with an overlap, the first sealant polymer layer 43 faces the second sealant polymer layer 45 at the overlapped portion. When heat or pressure is applied thereto, the first sealant polymer layer 43 and the second sealant polymer layer 45 melt at the overlapped portion to accomplish perfect sealing. Thus, it is possible to prevent infiltration of water into the battery most effectively.

Figure 5:
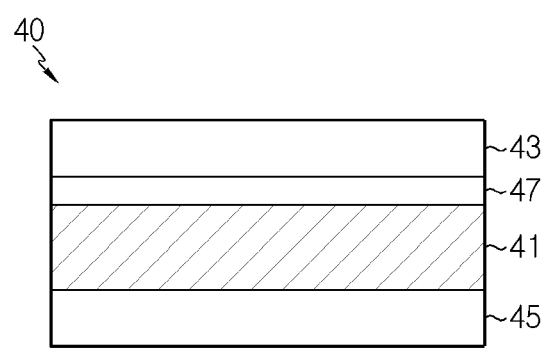
FIG. 5 to FIG. 7 are schematic sectional views each illustrating the sheet type packaging according to another embodiment of the present disclosure.
Figure 6:
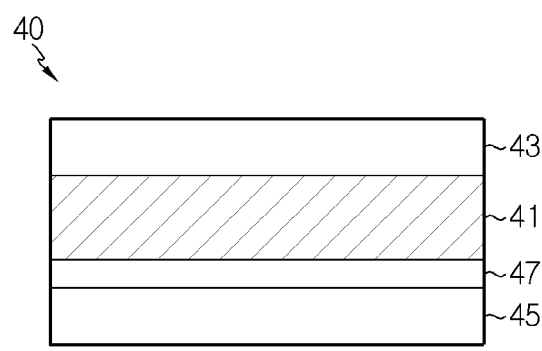
Figure 7:
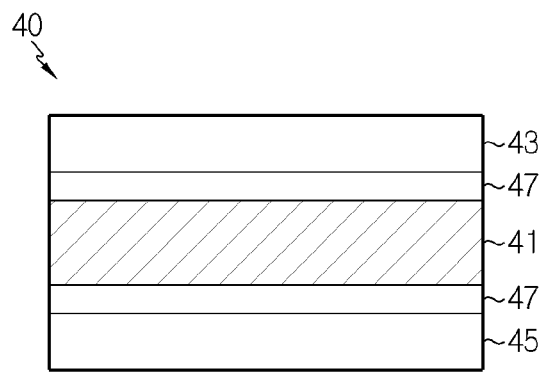

FIG. 5 to FIG. 7 are schematic sectional views each illustrating the sheet type packaging according to another embodiment of the present disclosure.

Referring to FIG. 5 to FIG. 7, the sheet type packaging 40 according to the present disclosure may further include a mechanical support layer 47 formed between the water barrier film 41 and the first sealant polymer layer 43, a mechanical support layer 47 formed between the water barrier film 41 and the second sealant polymer layer 45, or mechanical support layers 47 formed not only between the water barrier film 41 and the first sealant polymer layer 43 but also between the water barrier film 41 and the second sealant polymer layer 45.

The mechanical support layer 47 functions to prevent the water barrier layer from being torn or damaged by external stress or impact, and any material may be used for the mechanical support layer with no particular limitation, as long as it has such mechanical properties. For example, the mechanical support layer 47 may include any one selected from the group consisting of polyester, polyamide, polyimide and polyolefin, or a mixture thereof.

In addition, considering a combination having low adhesion among the water barrier film 41, the sealant polymer layers 43, 45 and the mechanical support layer 47, an adhesive layer may be further incorporated between the layers facing each other among the water barrier film 41, the first sealant polymer layer 43, the mechanical support layer 47 and the second sealant polymer layer 45. In this manner, it is possible to further improve adhesive property and water barrier property. The adhesive layer may include, for example, a composition containing a urethane-based material, acrylic material and a thermoplastic elastomer, but is not limited thereto.

The sheet type packaging formed by spiral winding may be used alone as a packaging for a cable type secondary battery, or may be further provided with a polymer resin layer including various polymers as an outermost layer for the sheet type packaging formed by spiral winding.

Preferably, the sheet type packaging may include, as the outermost layer, a heat shrinking tube surrounding the whole outer surface of the sheet type packaging formed by spiral winding. The heat shrinking tube means a tube which is shrunk under heating and surrounds a terminal or a material having a different shape or size skin-tightly with no gap. According to the present disclosure, when the sheet type packaging is wound spirally to surround the outer surface of the taping layer, inserted into a heat shrinking tube, and then heated, the heat shrinking tube is heated and shrunk by the heat conducted through the heat shrinking tube so that skin-tight sealing may be accomplished with no gap between the cable type electrode assembly with the sheet type packaging surrounding the outer surface of the taping layer and the heat shrinking tube. Therefore, it is possible to further improve the water barrier property of the packaging by virtue of such skin-tight packaging and to obtain an insulation effect through the heat shrinking tube. In addition, when using only the heat shrinking tube, water may be introduced into the battery because pores are present structurally in the heat shrinking tube. However, according to the present disclosure, it is possible for the whole of the sheet type packaging and the heat shrinking tube to function to provide a water barrier effect, to improve the flexibility of the battery and to protect the cable-type secondary battery.

Since heat shrinking tubes using various materials and having various shapes are commercially available, a heat shrinking tube suitable for the purpose of the present disclosure can be purchased and used with ease. It is required to set the temperature of shrinking processing at a low temperature in order to prevent any thermal damage to the secondary battery, and to complete shrinking at a temperature of generally 70-200° C., preferably 70-150° C., more preferably 100-150° C., and even more preferably 70-120° C. Such a heat shrinking tube may include polyolefin, such as polyethylene or polypropylene, polyester such as polyethylene terephthalate, fluororesin, such as polyvinylidene fluoride or polytetrafluoroethylene, and polyvinyl chloride, or a combination of two or more of them.

Herein, the cable type secondary battery may further include an adhesive layer in order to improve the adhesion between the outer surface of the sheet type packaging and the heat shrinking tube. By virtue of this, it is possible to further improve the adhesive property and water barrier property. For example, the adhesive layer may include a composition containing a urethane-based material, acrylic material or a thermoplastic elastomer, but is not limited thereto.

Meanwhile, the cable type secondary battery according to the present disclosure may have a longitudinally elongated shape having a predetermined shape of horizontal section. Herein, the term 'predetermined shape' means that there is no particular limitation in shape and any shape may be used as long as it does not adversely affect the scope of the present disclosure. Such a predetermined shape of horizontal shape may be a circular or polygonal shape. The circular shape includes a geometrically perfect symmetric circular shape and an asymmetric elliptical shape. There is no particular limitation in polygonal shape and non-limiting examples thereof include a triangle, quadrangle, pentagon or a hexagon.

The cable type secondary battery according to the present disclosure has a predetermined shape of horizontal section and a linear structure elongated along the longitudinal direction of the horizontal section and shows flexibility, and thus is freely deformable.

According to the present disclosure, the inner electrode may be provided with a lithium ion-supplying core portion containing an electrolyte, an open structured inner current collector formed to surround the outer surface of the lithium ion-supplying core portion, and an inner electrode active material layer formed on the surface of the inner current collector.

The term 'open structure' refers to a structure which has the open structure as a boundary surface and allows free mass transfer from the inside to the outside through the boundary surface.

Since the inner electrode according to an embodiment of the present disclosure is provided with a lithium ion-supplying core portion including an electrolyte and the inner electrode according to the present disclosure has an open structure, the electrolyte of the lithium ion supplying core portion may pass through the inner current collector of the open structure and arrive at the inner electrode active material layer and the outer electrode active material layer. Therefore, there is no need for increasing the thickness of the electrolyte layer excessively. Rather, since the electrolyte layer is not an essential constitutional element, it is possible to use a separator alone, if required. In other words, the open structured cable type secondary battery is provided with a lithium ion-supplying core portion containing an electrolyte to allow easy infiltration to an electrode active material so that supply and exchange of lithium ions may be facilitated. As a result, it is possible to provide the battery with excellent capacity characteristics and cycle characteristics.

The lithium ion-supplying core portion includes an electrolyte. Although there is no particular limitation in the electrolyte, it is preferred to use a non-aqueous electrolyte using ethylene carbonate (EC), propylene carbonate (PC), butylene carbonate (BC), vinylene carbonate (VC), diethyl carbonate (DEC), dimethyl carbonate (DMC), ethyl methyl carbonate (EMC), methyl formate (MF), γ-butyrolactone, sulfolane, methyl acetate (MA) or methyl propionate (MP); a gel polymer electrolyte using PEO, PVdF, PMMA, PAN or PVAc; and a solid electrolyte using PEO, polypropylene oxide (PPO), polyethylene imine (PEI), polyethylene sulfide (PES) or polyvinyl acetate (PVAC). In addition, the electrolyte may further include a lithium salt, such as LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lithium lower aliphatic carboxylate or lithium tetraphenylborate. In addition, the lithium ion-supplying core portion may include an electrolyte alone. In the case of a liquid electrolyte, a porous carrier may be used.

The inner current collector may have an open structure to facilitate the infiltration of the electrolyte of the lithium ion-supplying core portion. Any open structure may be used, as long as it facilitates infiltration of the electrolyte. For example, a wound wire type current collector, wound sheet type current collector or a mesh type current collector may be used.

The inner current collector may be made of stainless steel, aluminum, nickel, titanium, baked carbon or copper; stainless steel surface-treated with carbon, nickel, titanium or silver; aluminum-cadmium alloy; a non-conductive polymer surface-treated with a conductive material; or a conductive polymer.

The current collector functions to collect the electrons generated by the electrochemical reaction of an electrode active material or to supply the electrons required for electrochemical reaction. In general, such a current collector uses a metal, such as copper or aluminum. Particularly, when using a polymer conductor including a non-conductive polymer surface-treated with a conductive material or a polymer conductor, it is possible to provide relatively higher flexibility as compared to the current collector using a metal, such as copper or aluminum. In addition, a polymer current collector may be used instead of a metal current collector to accomplish weight lightening of a battery.

The conductive material may be any one selected from the group consisting of polyacetylene, polyaniline, polypyrrole, polythiophene, polysulfur nitride, indium tin oxide (ITO), silver, palladium and nickel, and the conductive polymer may include polyacetylene, polyaniline, polypyrrole, polythiophene, polysulfur nitride, or the like. However, there is no particular limitation in the type of non-conductive polymer used for the current collector.

The inner electrode active material layer may be formed on the surface of the inner current collector. Herein, the inner electrode active material may be formed to surround the outer surface of the inner current collector so that the open structure of the inner current collector may not be exposed to the outside of the inner electrode active material layer. The inner electrode active material layer may also be formed on the surface of the open structure of the inner current collector so that the open structure of the inner current collector may be exposed to the outside of the inner electrode active material layer. For example, the active material layer may be formed on the surface of a wound wire type current collector. In addition, a wire type current collector having an electrode active material formed thereon may be used after winding.

Although there is no particular limitation in the shape of the outer current collector, a pipe type current collector, wound wire type current collector, wound sheet type current collector or a mesh-type current collector may be used. In addition, the outer current collector may be made of stainless steel, aluminum, nickel, titanium, baked carbon or copper; stainless steel surface-treated with carbon, nickel, titanium or silver; aluminum-cadmium alloy; a non-conductive polymer surface-treated with a conductive material; a conductive polymer; metal paste including metal powder which is Ni, Al, Au, Pd/Ag, Cr, Ta, Cu, Ba or ITO; or carbon paste containing carbon powder which is graphite, carbon black or a carbon nanotube.

Meanwhile, a polymer support layer may be formed on the outer surface of the outer electrode in order to improve the flexibility of the outer electrode and to prevent the separation of the electrode active material layer. Herein, the same material may be used for both of the polymer support layer and the sealant polymer layers formed in the sheet type packaging according to the present disclosure so that the outer electrode may be perfectly in close contact with the sheet type packaging during the sealing carried out under heating or pressure. This is preferred in terms of the flexibility of the battery.

The inner electrode may be a negative electrode or positive electrode, and the outer electrode may be a positive electrode or negative electrode corresponding thereto.

The electrode active material layer functions to transport ions through the current collector, wherein the transport of ions is based on the interaction of ion intercalation from the electrolyte layer and ion deintercalation to the electrolyte layer. When the electrode active material layer is a negative electrode active material layer, the negative electrode active material may include: natural graphite, artificial graphite and a carbonaceous material; metals (Me), such as lithium-containing titanium composite oxide (LTO), Si, Sn, Li, Zn, Mg, Cd, Ce, Ni or Fe; alloys of the metals (Me); oxides (MeOx) of the metals (Me); and composites of the metals (Me) with carbon, or a mixture thereof. When the electrode active material layer is a positive electrode active material layer, the positive electrode active material may include $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, each of x, y and z independently represents an atomic proportion of an element forming the oxides, and $0 \leq x \leq 0.5$, $0 \leq y < 0.5$, $0 \leq z < 0.5$, $0 < x+y+z \leq 1$).

According to the present disclosure, the separator layer may be an electrolyte layer or separator.

The electrolyte layer functioning as an ion channel may include a gel polymer electrolyte using PEO, PVdF, PMMA, PAN or PAVc; a solid electrolyte using polyethylene oxide (PEO), polypropylene oxide (PPO), polyethylene imine (PEI), polyethylene sulfide (PES) or polyvinyl acetate (PVAc); and the like. Preferably, the matrix for the solid electrolyte includes a polymer or ceramic glass as a fundamental skeleton. In the case of a general polymer electrolyte, ions may be transported very slowly in terms of reaction rate even though the ion conductivity is satisfied. Thus, it is preferred to use a gel type polymer electrolyte facilitating ion transport rather than a solid electrolyte. Such a gel type polymer electrolyte does not have good mechanical properties and thus may include a support in order to supplement mechanical properties. The support used herein may include a porous support or crosslinked polymer. Since the electrolyte layer according to the present disclosure also functions as a separator, use of an additional separator may be avoided.

The electrolyte layer according to the present disclosure may further include a lithium salt. Such a lithium salt can improve ion conductivity and reaction rate. Non-limiting examples of the lithium salt may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic lithium carboxylate and lithium tetraphenylborate.

Although there is no particular limitation, the separator may be a porous polymer substrate made of a polyolefin polymer selected from the group consisting of an ethylene homopolymer, propylene homopolymer, ethylene-butene copolymer, ethylene-hexene copolymer and ethylene-methacrylate copolymer; a porous polymer substrate made of a polymer selected from the group consisting of polyester, polyacetal, polyamide, polycarbonate, polyimide, polyetherether ketone, polyether sulfone, polyphenylene oxide, polyphenylene sulfide and polyethylene naphthalate; or a porous substrate formed of a mixture of inorganic particles and a binder polymer. Particularly, in order to transport the lithium ions of the lithium ion-supplying core portion easily to the outer electrode, it is preferred to use a separator made of a non-woven web corresponding to a porous substrate made of a polymer selected from the group consisting of polyester, polyacetal, polyamide, polycarbonate, polyimide, polyetherether ketone, polyether sulfone, polyphenylene oxide, polyphenylene sulfide and polyethylene naphthalate.

Examples will be described more fully hereinafter so that the present disclosure can be explained in more detail. The following examples may, however, be embodied in many different forms and should not be construed as limited to the exemplary embodiments set forth therein. Rather, these exemplary embodiments are provided so that the present disclosure will fully convey the scope of the present disclosure to those skilled in the art.

Example

First, negative active material slurry was prepared by using 70 wt % of graphite as a negative electrode active material, 5 wt % of Denka black as a conductive material and 25 wt % of polyvinylidene fluoride (PVdF) as a binder. Next, the negative electrode active material slurry was coated onto the outer surface of a wire type current collector made of copper and having a diameter of 250 μm to obtain a wire type inner electrode having a negative active material layer formed thereon.

Four wire type inner electrodes obtained as described were wound spirally so that they cross with each other to form a hollow inner electrode in which a spring-like lithium ion-supplying core portion can be present.

Then, a separator sheet was wound to surround the outer surface of the inner electrode to form a separator layer.

In addition, positive electrode active material slurry was prepared by using 80 wt % of $LiCoO_2$ as a positive electrode active material, 5 wt % of Denka black as a conductive material and 15 wt % of PVdF as a binder. Next, the positive electrode active material slurry was coated onto one surface of a sheet type current collector made of aluminum foil, followed by drying, and then was cut into a width of 2 mm, thereby providing a sheet type positive electrode for a secondary battery.

Then, the sheet type positive electrode was wound spirally on the outer surface of the separator layer to obtain a cable type electrode assembly.

After that, a sheet type tape made of polyethylene terephthalate and having a width of 2 mm was wound spirally to form a taping layer on the interface between the spirally wound sheet type positive electrodes.

Then, a heat shrinking tube having a water barrier layer was formed on the outer surface of the taping layer and heated so that it may be shrunk, thereby forming a protective coating layer.

Finally, a non-aqueous electrolyte (1M $LiPF_6$, EC:PC:DEC=1:1:1 (volume ratio)) was injected to the central portion of the inner electrode by using a syringe to form a lithium ion-supplying core portion and sealing was carried out completely to obtain a cable type secondary battery.

Comparative Example

A cable type secondary battery was obtained in the same manner as Example, except that the heat shrinking tube having a water barrier layer was formed directly on the outer surface of the spirally wound sheet type positive electrode for a secondary battery, while not forming the taping layer.

Repeated Bending Test for Cable Type Secondary Batteries

Each of the cable type secondary batteries obtained according to Example and Comparative Example was subjected to a repeated bending test. Herein, the test was carried out with a bend radius R of 15 mm. The results are shown in FIG. 8.

Figure 8:
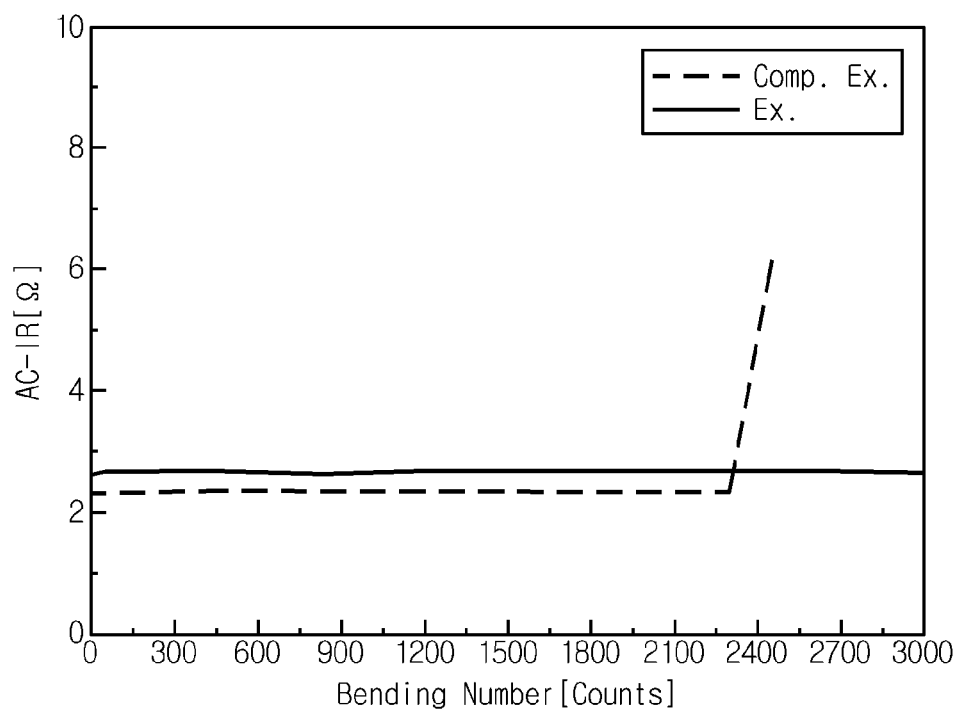
FIG. 8 is a graph illustrating the resistance values of the cable type secondary batteries obtained according to Example and Comparative Example after a repeated bending test.

Referring to FIG. 8, even after the cable type secondary battery according to Example was subjected to the repeated bending test up to 3,000 counts, it causes no increase in resistance. However, the cable type secondary battery according to Comparative example causes an increase in resistance at about 2,300 counts. It can be seen from the above results that the cable type secondary battery according to Examples has reinforced bending characteristics by virtue of the taping layer.

It should be understood that the detailed description and specific examples, while indicating preferred embodiments of the disclosure, are given by way of illustration only, and the scope of the present disclosure are not limited thereto. Besides the above-described embodiments, various changes and modifications within the scope of the disclosure will become apparent to those skilled in the art from this detailed description.

What is claimed is:

1. A cable type secondary battery which comprises:
a cable type electrode assembly including an inner electrode, a separator layer formed to surround an outer surface of the inner electrode and preventing a short-circuit between electrodes such that the separator layer is outside the entire inner electrode, and an outer electrode formed to surround the separator layer such that the outer electrode is outside the entire separator layer;
a taping layer formed by helically winding a sheet type tape to surround an outer surface of the cable type electrode assembly; and
a packaging formed to surround an outer surface of the taping layer.

2. The cable type secondary battery according to claim 1, wherein the sheet type tape has a strip structure extended in one direction.

3. The cable type secondary battery according to claim 1, wherein the sheet type tape is helically wound so that overlaps itself.

4. The cable type secondary battery according to claim 1, wherein the sheet type tape comprises polyethylene terephthalate, polypropylene, thermoplastic polyurethane, Teflon, or a combination thereof.

5. The cable type secondary battery according to claim 1, wherein the sheet type tape comprises a bonding layer for retaining its adhesion after impregnation with an electrolyte.

6. The cable type secondary battery according to claim 5, wherein the bonding layer comprises polyacrylate, polyimide, polyamide, polyacrylonitrile, cyanoacrylate, epoxy, or a combination thereof.

7. The cable type secondary battery according to claim 1, wherein the outer electrode is a sheet type outer electrode formed by helical winding so that it surrounds the outer surface of the separator layer.

8. The cable type secondary battery according to claim 7, wherein the sheet type outer electrode has a strip structure extended in one direction.

9. The cable type secondary battery according to claim 7, wherein the sheet type tape is formed on the interface between the sheet type outer electrodes formed by helical winding.

10. The cable type secondary battery according to claim 1, wherein the packaging is a sheet type packaging formed by helical winding so that it surrounds the outer surface of the taping layer.

11. The cable type secondary battery according to claim 10, wherein the sheet type packaging has a strip structure extended in one direction.

12. The cable type secondary battery according to claim 10, wherein the sheet type packaging is helically wound so that it overlaps itself.

13. The cable type secondary battery according to claim 10, wherein the sheet type packaging is provided with a water barrier film, a first sealant polymer layer formed on one surface of the water barrier film, and a second sealant polymer layer formed on another surface of the water barrier film.

14. The cable type secondary battery according to claim 13, wherein the first sealant polymer layer and the second sealant polymer layer comprise the same material.

15. The cable type secondary battery according to claim 13, wherein the sheet type packaging further comprises a mechanical support layer formed between the water barrier film and the first sealant polymer layer, or between the water barrier film and the second sealant polymer layer.

16. The cable type secondary battery according to claim 10, further comprising a heat shrinking tube surrounding a whole outer surface of the sheet type packaging formed by helical winding.

17. The cable type secondary battery according to claim 1, wherein the inner electrode is provided with a lithium ion-supplying core portion containing an electrolyte, an open structured inner current collector formed to surround an outer surface of the lithium ion-supplying core portion, and an inner electrode active material layer formed on a surface of the inner current collector.

18. The cable type secondary battery according to claim 17, wherein the open structured inner current collector is a wound wire type current collector, a wound sheet type current collector, or a mesh type current collector.

19. The cable type secondary battery according to claim 12, wherein the sheet type packaging is helically wound so that a width of its overlapped part is less than or equal to 50% of a width of the sheet type packaging.

20. A cable type secondary battery which comprises:
a cable type electrode assembly including an inner electrode, a separator layer formed to surround an outer surface of the inner electrode and preventing a short-circuit between electrodes, and an outer electrode formed to surround the separator layer;
a taping layer formed by helically winding a sheet type tape to surround an outer surface of the cable type electrode assembly; and
a heat shrinking tube surrounding an outer surface of the taping layer.

* * * * *

UNITED STATES PATENT AND TRADEMARK OFFICE
CERTIFICATE OF CORRECTION

PATENT NO. : 10,673,047 B2  
APPLICATION NO. : 15/772300  
DATED : June 2, 2020  
INVENTOR(S) : In-Sung Uhm et al.

Page 1 of 1

It is certified that error appears in the above-identified patent and that said Letters Patent is hereby corrected as shown below:

On the Title Page

Item [73] Assignee: "KG Chem, Ltd." should read --LG Chem, Ltd.--.

Signed and Sealed this  
Eighth Day of September, 2020

Andrei Iancu  
*Director of the United States Patent and Trademark Office*